United States Patent
Nadehara

(10) Patent No.: US 7,558,018 B1
(45) Date of Patent: *Jul. 7, 2009

(54) HEAD POSITION DETECTOR WITH OPTICAL SLIT PATTERN

(75) Inventor: Shuhei Nadehara, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 12/248,036

(22) Filed: Oct. 8, 2008

Related U.S. Application Data

(63) Continuation of application No. 12/058,744, filed on Mar. 30, 2008, now Pat. No. 7,463,444.

(51) Int. Cl.
*G11B 21/02* (2006.01)
*G11B 5/584* (2006.01)

(52) U.S. Cl. .............. 360/75; 360/77.12; 360/240

(58) Field of Classification Search .......... None
See application file for complete search history.

(56) References Cited

U.S. PATENT DOCUMENTS

| | | | | |
|---|---|---|---|---|
| 4,291,346 | A | | 9/1981 | Beecroft |
| 5,270,529 | A | * | 12/1993 | Shudo ............ 350/205 |
| 5,592,351 | A | * | 1/1997 | Carter ............ 360/261.3 |
| 6,480,351 | B2 | | 11/2002 | Leonhardt et al. |
| 7,002,771 | B2 | * | 2/2006 | Christie et al. ........ 360/77.12 |
| 2002/0057523 | A1 | | 5/2002 | Sakaguchi |

OTHER PUBLICATIONS

PCT Publication WO8909988A1 of Dolby et al., Oct. 19, 1989.
Japanese Patent Publication 09-306123 of Tsuneo et al., Nov. 21, 1997.
English Language Abstract of Japanese Patent Publication 09-306123.
Machine translation of Japanese Patent Publication 09-306123.

* cited by examiner

*Primary Examiner*—Andrew L Sniezek
(74) *Attorney, Agent, or Firm*—Jackson Patent Law Office

(57) ABSTRACT

Disclosed are systems and methods for positioning a head. An exemplary system includes a light source; a detector configured to receive signals from the light source; a transducer that reads signals from a magnetic tape; a plurality of structures coupled to the transducer and configured to pass in opposition to the detector; a stepping motor; and circuitry configured to determine whether or not a light signal is received by the detector. If the light signal is received, the circuitry commands the stepping motor to move the transducer incrementally in a first direction. If the light signal is interrupted by moving the transducer within a first distance, the circuitry commands the stepping motor to move the transducer in a direction opposite the first direction until the light signal has been continuously received across more than the first distance. If the light signal is not interrupted by moving the transducer within the first distance, continue to the circuitry commands the stepping motor to move the transducer incrementally in a first direction until the light signal is interrupted. If the first determining step determines that the light signal is not received, the circuitry commands the stepping motor to move the transducer incrementally in a direction opposite the first direction.

1 Claim, 3 Drawing Sheets

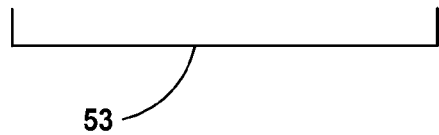
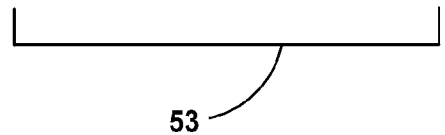
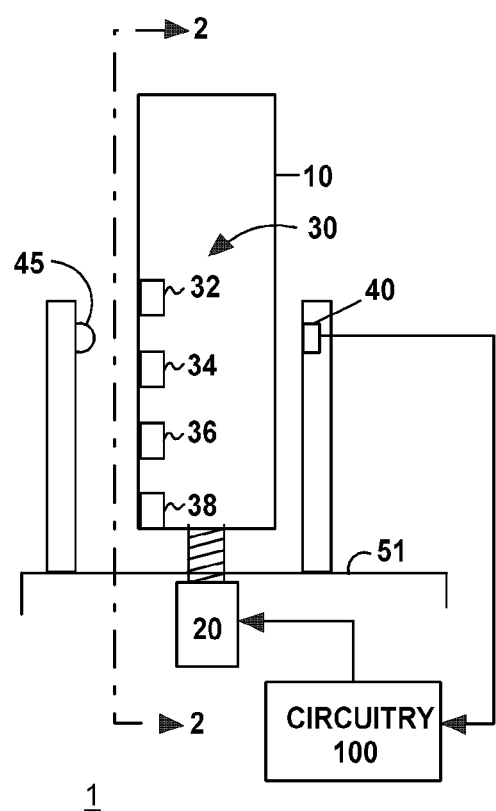
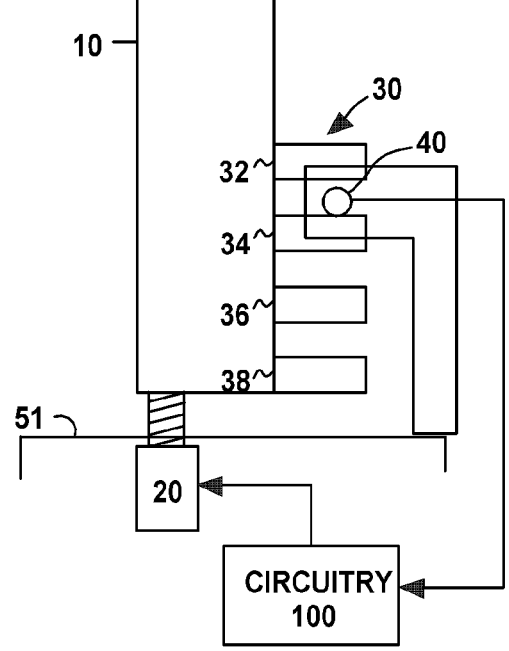
Fig. 1          Fig. 2

HEAD POSITION DETECTOR WITH OPTICAL SLIT PATTERN

This application is a continuation of U.S. application Ser. No. 12/058,744 of SHUHEI NADEHARA filed Mar. 30, 2008 now U.S. Pat. No. 7,463,444 for HEAD POSITION DETECTOR WITH OPTICAL SLIT PATTERN, the contents of which are herein incorporated by reference.

BACKGROUND OF THE INVENTION

1. Field of the Invention

This invention relates generally to systems and methods for positioning and, more particularly, to systems and methods of positioning a transducer in a storage device such as a tape drive.

2. Description of Related Art

The 3584 LTO drive head is positioned based on the bottom position as a reference position and moves to a specified position with a stepping motor. The position of the head is unknown when the drive is switched on. Then, the bottom position is sought while the head is moved. The head is sometimes moved out of the permissible range during the search, which may break the head mechanism.

Specifically, the conventional 3854 LTO drive has a light blocking shield, attached to the head, for detecting the bottom position and a photo-interrupter attached to a case. The bottom position is based on the border between the place where the photo-interrupter crosses the light-blocking shield and the place where the photo-interrupter does not cross the light-blocking shield. If the photo-interrupter crosses the light-blocking shield when the drive is switched on, the border can be found while the head is moved in the direction away from the bottom. If the photo-interrupter does not cross the light-blocking shield, the border can be found while the head is moved toward the bottom. If the sensor is unplugged, the drive is always in the same situation as when the photo-interrupter crosses the light-blocking shield. Accordingly, in such a case, the method causes the head to keep moving in the direction away from the bottom even over the range allowed for the head to move, which breaks the head mechanism.

The 3584 Gen4 drive has a mechanism for checking whether the photoreceptor side of the photo-interrupter responds or not by controlling ON/OFF of the LED of the photo-interrupter for the purpose of checking the operation of the photo-interrupter. That can confirm that the drive is plugged. If no response is detected, the mechanism cannot determine whether the drive is unplugged or the photo-interrupter is crossing the light-blocking shield. Then, the mechanism slightly moves the head. If the head is already at the limit of the range allowed for it to move, that movement breaks the head. (When the drive is powered down, the head is usually placed at a place other than the bottom position to prevent that incident. Sometimes, however, the power abruptly breaks when the head is at the bottom position.)

Mechanically, that incident can be prevented by removing the ditch of screws for the head not to move to out of the range. For that purpose, the length of the ditch to be removed needs to be wide enough for the size of the head. This is not the best measure when the height of the device is limited.

The head may be physically stopped by an overshoot preventing piece (Japanese Unexamined Patent Application Publication No. 5-128701, Japanese Unexamined Patent Application Publication No. 10-334536.)

SUMMARY OF THE INVENTION

There is a system comprising a light source; a detector configured to receive signals from the light source; a transducer that reads signals from a magnetic tape; a plurality of structures coupled to the transducer and configured to pass in opposition to the detector; a stepping motor; and circuitry. The circuitry is configured to determine whether or not a light signal is received by the detector; if the light signal is received, command the stepping motor to move the transducer incrementally in a first direction; if the light signal is interrupted by moving the transducer within a first distance, command the stepping motor to move the transducer in a direction opposite the first direction until the light signal has been continuously received across more than the first distance; if the light signal is not interrupted by moving the transducer within the first distance, continue to command the stepping motor to move the transducer incrementally in a first direction until the light signal is interrupted; and if the first determining step determines that the light signal is not received, command the stepping motor to move the transducer incrementally in a direction opposite the first direction.

BRIEF DESCRIPTION OF THE DRAWINGS

References are made to the following text taken in connection with the accompanying drawings, in which:

FIG. 1 is a diagram showing an exemplary positioning system in accordance with a first exemplary embodiment of the present invention.

FIG. 2 is a diagram showing a plan view of the exemplary positioning system shown in FIG. 1.

Figure 3:
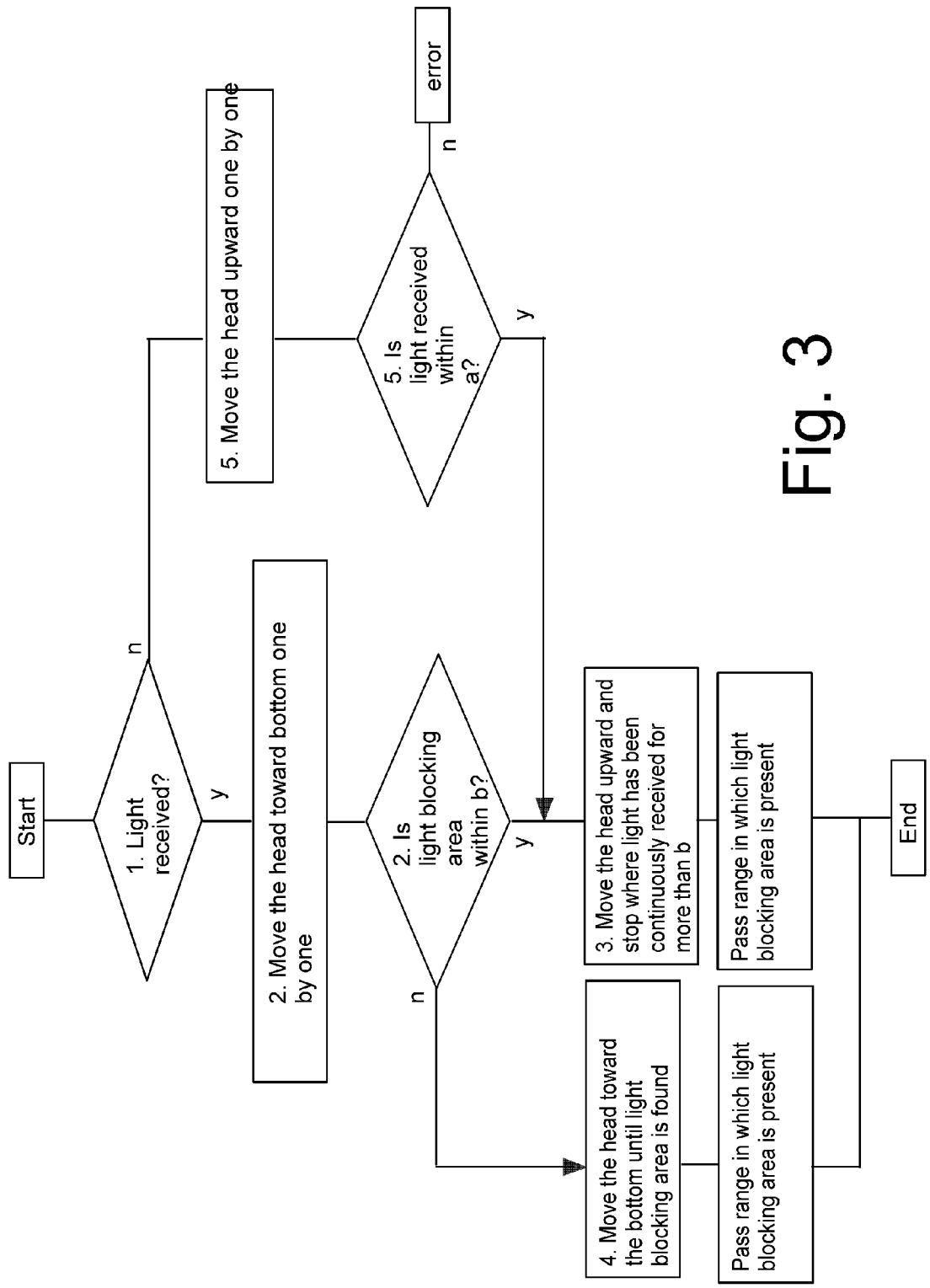
FIG. 3 is a flowchart of processing performed by the first exemplary system.

The accompanying drawings which are incorporated in and which constitute a part of this specification, illustrate embodiments of the invention and, together with the description, explain the principles of the invention, and additional advantages thereof. Certain drawings are not necessarily to scale, and certain features may be shown larger than relative actual size to facilitate a more clear description of those features. Throughout the drawings, corresponding elements are labeled with corresponding reference numbers.

DETAILED DESCRIPTION OF EXEMPLARY EMBODIMENTS

First Exemplary Embodiment

FIG. 1 shows a first exemplary system 1, including a transducer head body 10, a stepping motor 20 for moving the head body 10, a photo detector 40 configured to receive light from the light source 45, and a light blocking shield 30. The light blocking shield 30 includes projections 32, 34, 36, and 38 that define slits between the projections.

FIG. 2 is a view taken along the line 2-2 and FIG. 1.

Stepping motor 20 moves head 10 between the case bottom 51 and the case top 53. When transducer head 10 is near the case bottom 51, projections 32, 34, 36, and 38 act to block the light received by photo detector 40.

In the description of the first exemplary embodiment, the width of the projections is a, and the slit width between the projections is b.

The photo detector 40 is attached to the case bottom 51.

The distance the head 10 moves when 1 pulse is applied to the stepping motor 2 is 1. The slits on the light-blocking shield 30 are such that the width of the light blocking area is a, the width of the aperture is b, and the number of light blocking areas is p. By taking account of the resolution of the photo-interrupter (approximately 0.2 mm), a=b=0.5 mm, p=4.

FIG. 3 shows a process, carried out by circuitry 100, that can determine the bottom position without breaking the head 3 even if the device is unplugged. Circuitry 100 determines whether the photo detector 40 is receiving the light. (step 1). If the light is received, it is determined that the device is plugged. Then, the operation proceeds to step 2. If the light is blocked, it is determined that the device is unplugged or that the head is at the light-blocking area. Then, the operation proceeds to step 5.

Move the head toward the bottom one by one.

When the light blocking area is found by moving the head by the distance b or less, it is determined that the head is within the range of light-blocking shields. Then, the operation proceeds to step 3.

When the light blocking area is not found by moving the head by the distance b or less, it is determined that the head is upper than the bottom position. Then, the operation proceeds to step 4.

The head is moved upward. When the light has been serially received by a or more number of moving steps, it is determined that the head is just out from the range of light-blocking shields. Then, the head is returned toward the bottom by the distance a. Where the head is moved by a*p+b*(p−1) is the bottom position. Then, the operation proceeds to step 9.

4. The head is moved until the light-blocking area is found at the bottom side. Where the head is moved by a*p+b*(p−1) from the position of the found light-blocking area is the bottom position. Then, the operation proceeds to step 9.

5. Move the head upward one by one.

When an aperture is found by moving the head by the distance a or less, it is determined that the head is within the range of light-blocking shields. Then, the operation proceeds to step 3.

If the aperture is not found by moving the head by the distance a or less, it is determined that the device is unplugged. Then, the operation finishes as an error.

9. It is determined that the head is at the bottom position and the operation normally finishes.

Figure 4:
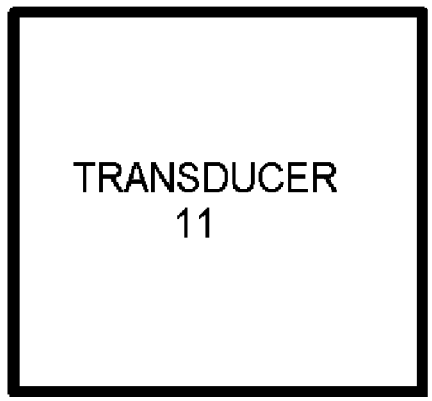
FIG. 4 is a diagram emphasizing another aspect of the first exemplary system.
Figure 4:
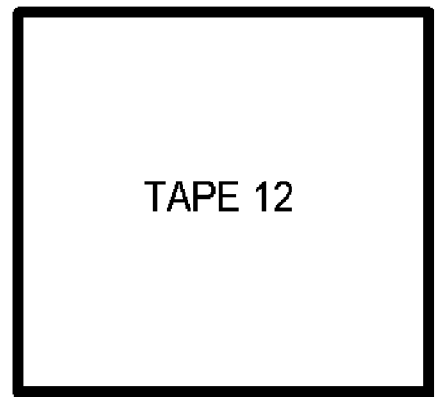

In summary, system 1 includes a light source 45, a detector 40 configured to receive signals from the light source, a head 10 containing a transducer 11 that reads signals from a tape 12 (FIG. 4), and a plurality of projections 32, 34, 36, and 38 coupled to the transducer head 10 and configured to pass in opposition to the detector 40.

Circuitry 100 acts to determine if a light signal is received by the detector 40. If the light signal is received, circuitry 100 sends a signal to motor 20, to move head 1 step toward the bottom. If the light signal is interrupted and the head has only been moved within the slit width b, circuitry 100 sends a signal to motor 20, to move the head 10 toward the top until the light signal has been continuously received across more than the distance b.

If the light signal is not interrupted by moving the transducer within b, circuitry 100 continues to send signals to motor 20 to move head 10 toward the bottom.

Second Exemplary Embodiment

The light-blocking shields are attached across the whole range of the head.

The width of the aperture differs according to the place. Specifically, the width of the nth aperture is like $$bn = b1 + d*n$$

Then, the current head position can be determined when the head is moved and the width of the nearest aperture is measured. By taking advantage of that, a difference of position due to loss of synchronization of the stepping motor can be corrected.

Throughout this patent application, certain processing may be depicted in serial, parallel, or other fashion, for ease of description. Actual hardware and software realizations, however, may be varied depending on desired optimizations apparent to one of ordinary skill in the art.

In this patent application, the word circuitry encompasses dedicated hardware, and/or programmable hardware, such as a central processing unit (CPU) or reconfigurable logic array, in combination with programming data, such as sequentially fetched CPU instructions or programming data for a reconfigurable array. Thus, circuitry encompasses, for example, a general-purpose electronic processor programmed with software, acting to carry out a described function.

Benefits, other advantages, and solutions to problems have been described above with regard to specific examples. The benefits, advantages, solutions to problems, and any element(s) that may cause any benefit, advantage, or solution to occur or become more pronounced are not critical, required, or essential feature or element of any of the claims.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of Applicants' general inventive concept. The invention is defined in the following claims. In general, the words "first," "second," etc., employed in the claims do not necessarily denote an order.

What is claimed is:

1. A system comprising:
   a light source;
   a detector configured to receive signals from the light source;
   a transducer that reads signals from a magnetic tape;
   a plurality of structures coupled to the transducer and configured to pass in opposition to the detector;
   a stepping motor; and
   circuitry configured to
      determine whether or not a light signal is received by the detector;
      if the light signal is received, command the stepping motor to move the transducer incrementally in a first direction;
      if the light signal is interrupted by moving the transducer within a first distance, command the stepping motor to move the transducer in a direction opposite the first direction until the light signal has been continuously received across more than the first distance;
      if the light signal is not interrupted by moving the transducer within the first distance, continue to command the stepping motor to move the transducer incrementally in a first direction until the light signal is interrupted; and
      if the first determining step determines that the light signal is not received, command the stepping motor to move the transducer incrementally in a direction opposite the first direction.

* * * * *